(12) United States Patent
Thistle et al.

(10) Patent No.: US 10,662,784 B2
(45) Date of Patent: May 26, 2020

(54) DAMPER WITH VARYING THICKNESS FOR A BLADE

(71) Applicant: United Technologies Corporation, Farmington, CT (US)

(72) Inventors: Charles Thistle, Middletown, CT (US); Mohamed Hassan, Palm City, FL (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 366 days.

(21) Appl. No.: 15/362,779

(22) Filed: Nov. 28, 2016

(65) Prior Publication Data

US 2018/0149025 A1   May 31, 2018

(51) Int. Cl.
*F01D 5/26* (2006.01)
*F01D 5/22* (2006.01)
*F01D 5/02* (2006.01)
*F01D 5/16* (2006.01)
*F01D 5/30* (2006.01)
(Continued)

(52) U.S. Cl.
CPC ................ *F01D 5/22* (2013.01); *F01D 5/02* (2013.01); *F01D 5/16* (2013.01); *F01D 5/3023* (2013.01); *F01D 11/006* (2013.01); *F01D 11/008* (2013.01); *F01D 25/06* (2013.01); *F04D 29/083* (2013.01); *F04D 29/322* (2013.01); *F04D 29/324* (2013.01); *F05D 2220/32* (2013.01); *F05D 2230/60* (2013.01); *F05D 2240/80* (2013.01); *F05D 2260/30* (2013.01); *F05D 2260/96* (2013.01); *Y02T 50/673* (2013.01)

(58) Field of Classification Search
CPC . F01D 5/16; F01D 5/22; F01D 11/006; F01D 11/008; F01D 25/06; F05D 2240/80; F05D 2260/96
See application file for complete search history.

(56) References Cited

U.S. PATENT DOCUMENTS

| 3,709,631 A | 1/1973 | Karstensen et al. |
| 3,752,598 A | 8/1973 | Bowers |

(Continued)

FOREIGN PATENT DOCUMENTS

| EP | 0851097 A2 | 7/1998 |
| EP | 1221539 A2 | 7/2002 |

(Continued)

OTHER PUBLICATIONS

English Machine Translation for JPH09303107.
(Continued)

*Primary Examiner* — Ninh H. Nguyen
(74) *Attorney, Agent, or Firm* — Cantor Colburn LLP (57) ABSTRACT

A blade for a gas turbine engine. The blade having: a root; a platform located between the root and the blade, wherein the platform defines a cavity; a damper seal received in the cavity, the damper seal having a main body portion that extends along a major axis of the damper seal between a first end portion and an opposing second end portion of the damper seal, the first end portion and the second end portion each extend towards the root when the damper seal is located in the cavity and wherein the damper seal has a variable thickness along at least a portion of a minor axis of the damper seal that extends between opposite peripheral edges of the main body portion.

20 Claims, 4 Drawing Sheets

(51) Int. Cl.
*F01D 11/00* (2006.01)
*F01D 25/06* (2006.01)
*F04D 29/08* (2006.01)
*F04D 29/32* (2006.01)

(56) References Cited

U.S. PATENT DOCUMENTS

| | | | |
|---|---|---|---|
| 4,029,436 A | 6/1977 | Shoup et al. | |
| 4,183,720 A * | 1/1980 | Brantley | F01D 5/22 416/193 A |
| 4,580,946 A | 4/1986 | Bobo | |
| 5,143,517 A | 9/1992 | Vermont | |
| 5,156,528 A * | 10/1992 | Bobo | F01D 5/22 416/190 |
| 5,161,949 A | 11/1992 | Brioude et al. | |
| 5,226,784 A | 7/1993 | Mueller et al. | |
| 5,313,786 A | 5/1994 | Chlus et al. | |
| 5,415,526 A * | 5/1995 | Mercadante | F01D 5/081 416/190 |
| 5,478,207 A * | 12/1995 | Stec | F01D 5/22 416/219 R |
| 5,785,499 A | 7/1998 | Houston et al. | |
| 5,820,346 A | 10/1998 | Young | |
| 5,827,047 A | 10/1998 | Gonsor et al. | |
| 5,924,699 A | 7/1999 | Airey et al. | |
| 6,171,058 B1 | 1/2001 | Stec | |
| 6,450,769 B2 | 9/2002 | Szwedowicz | |
| 6,478,544 B2 * | 11/2002 | Brandl | F01D 5/22 416/190 |
| 6,851,932 B2 * | 2/2005 | Lagrange | F01D 5/22 416/190 |
| 7,021,898 B2 * | 4/2006 | Elliott | F01D 5/081 415/119 |
| 7,121,802 B2 | 10/2006 | Athans et al. | |
| 7,762,773 B2 | 7/2010 | Liang | |
| 8,167,563 B2 * | 5/2012 | Kayser | F01D 5/22 416/190 |
| 8,240,987 B2 | 8/2012 | Spangler et al. | |
| 8,322,990 B2 | 12/2012 | Hunt | |
| 8,353,672 B2 | 1/2013 | Townes et al. | |
| 8,820,754 B2 | 9/2014 | Stewart | |
| 8,888,456 B2 * | 11/2014 | Borufka | F01D 5/22 416/96 R |
| 8,961,137 B2 | 2/2015 | Berche | |
| 2010/0054917 A1 | 3/2010 | Razzell | |
| 2010/0061854 A1 * | 3/2010 | Townes | F01D 5/10 416/95 |
| 2013/0195665 A1 | 8/2013 | Snyder et al. | |
| 2013/0276456 A1 | 10/2013 | Propheter-Hinckley et al. | |
| 2016/0061048 A1 | 3/2016 | Corcoran | |
| 2016/0251963 A1 | 9/2016 | Tardif et al. | |
| 2016/0273367 A1 | 9/2016 | Lana et al. | |
| 2018/0187558 A1 | 7/2018 | Thistle et al. | |
| 2018/0187559 A1 | 7/2018 | Thistle et al. | |
| 2018/0187562 A1 | 7/2018 | Thistle et al. | |

FOREIGN PATENT DOCUMENTS

| | | |
|---|---|---|
| EP | 1600606 | 11/2005 |
| EP | 1867836 A2 | 12/2007 |
| EP | 2098687 A1 | 9/2009 |
| FR | 2927357 A1 | 8/2009 |
| JP | H09303107 A | 11/1997 |
| JP | 2003020995 A | 1/2003 |
| JP | 2003056490 | 2/2003 |
| JP | 2006125372 A | 5/2006 |
| JP | 2014185646 | 10/2014 |
| WO | 03014529 A1 | 2/2003 |
| WO | 2007063128 A1 | 6/2007 |
| WO | 2013154657 A2 | 10/2013 |
| WO | 2014004001 A1 | 1/2014 |
| WO | 2014160641 A1 | 10/2014 |

OTHER PUBLICATIONS

European Search Report for Application No. EP 17 20 4019.
English Machine Translation of EP2098687.
English Machine Translation of FR2927357.
European Search Report for Application No. EP 18 15 0229.
European Search Report for Application No. EP 18 15 0231.
European Search Report for Application No. EP 18 15 0242.
JP2003020995 English Machine Translation of Abstract.
JP2006125372 English Machine Translation of Abstract.
JP2014185646 English Machine Translation of Abstract.
English Machine Translation to Abstract JP2003056490.

* cited by examiner

DAMPER WITH VARYING THICKNESS FOR A BLADE

BACKGROUND

Exemplary embodiments of the present disclosure are directed to turbine blades and/or compressor blades for a gas turbine engine and methods for restraining a damper of a turbine blade and/or compressor blade.

A gas turbine engine includes a plurality of turbine blades and compressor blades each received in a slot of a disk. The blades are exposed to aerodynamic forces that can result in vibratory stresses. A seal damper or damper can be located under platforms of adjacent blades to reduce the vibratory response and provide frictional damping between the blades. The seal damper slides on an underside of the platforms. The seal damper is made of a material that is dissimilar from the material of the blades. When the vibratory motions of adjacent blades oppose each other (that is, occur out of phase), the seal damper slides to absorb the energy of vibration.

Seal dampers work by conforming to the underside of blade platforms to seal the mate-face gap between blades and provide frictional damping to suppress the vibratory response of the blades to excitations in the engine. These dampers are typically made of sheet metal and have been shown to readily conform to the underside of the platform when subjected to centrifugal loads in a high temperature environment due to their lack of stiffness out-of-plane.

Sometimes seal dampers will experience unintentional bulk tangential movement relative to the damper pocket due to the dynamic forces imposed on it by the rotation of the blades and the lack of sufficient restraint devices. To maximize damper efficiency, damper configurations are sought which minimize weight and maximize damper stiffness. Thus it is desirable to limit the number of weight increasing restraint devices on the damper (i.e. features which interlock with "damper tabs", "damper nubs", or some other feature of the under-platform geometry, or "bathtub" type designs that pre-conform to under-platform filleting).

Accordingly, it is desirable to a method and apparatus for restraining movement of a damper with respect to a blade platform.

BRIEF DESCRIPTION

In one embodiment, a blade for a gas turbine engine is provided. The blade having: a root; a platform located between the root and the blade, wherein the platform defines a cavity; a damper seal received in the cavity, the damper seal having a main body portion that extends along a major axis of the damper seal between a first end portion and an opposing second end portion of the damper seal, the first end portion and the second end portion each extend towards the root when the damper seal is located in the cavity and wherein the damper seal has a variable thickness along at least a portion of a minor axis of the damper seal that extends between opposite peripheral edges of the main body portion.

In addition to one or more of the features described above, or as an alternative to any of the foregoing embodiments, the variable thickness of the damper seal may be provided by a taper that extends partially along the minor axis of the damper seal between the opposite peripheral edges of the main body portion.

In addition to one or more of the features described above, or as an alternative to any of the foregoing embodiments, the variable thickness of the damper seal may be aligned with a suction side of the platform.

In addition to one or more of the features described above, or as an alternative to any of the foregoing embodiments, the variable thickness of the damper seal may be provided by a curved taper that extends partially along the minor axis of the damper seal between the opposite peripheral edges of the main body portion.

In addition to one or more of the features described above, or as an alternative to any of the foregoing embodiments, the variable thickness of the damper seal may be provided by a stepped taper that extends partially along the minor axis of the damper seal between the opposite peripheral edges of the main body portion.

In addition to one or more of the features described above, or as an alternative to any of the foregoing embodiments, the variable thickness of the damper seal may be provided by a taper that extends completely across the minor axis of the damper seal between the opposite peripheral edges of the main body portion.

In addition to one or more of the features described above, or as an alternative to any of the foregoing embodiments, the variable thickness of the damper seal may be aligned with a suction side of the platform.

In addition to one or more of the features described above, or as an alternative to any of the foregoing embodiments, the variable thickness of the damper seal may be aligned with a pressure side of the platform.

In addition to one or more of the features described above, or as an alternative to any of the foregoing embodiments, the damper seal may be formed from stamped sheet metal.

In addition to one or more of the features described above, or as an alternative to any of the foregoing embodiments, the variable thickness along at least a portion of a minor axis of the damper seal may be an increasing thickness.

In addition to one or more of the features described above, or as an alternative to any of the foregoing embodiments, the blade may be a turbine blade.

In addition to one or more of the features described above, or as an alternative to any of the foregoing embodiments, the blade may be a compressor blade.

In yet another embodiment, a gas turbine engine is provided. The gas turbine engine having: a disk; a plurality of blades secured to the disk, each of the blades having a root, and a platform located between the root and the blade, wherein a seam is defined by adjoining platforms of each of the blades when they are secured to the disk; and a damper seal received in the cavity, the damper seal having a main body portion that extends along a major axis of the damper seal between a first end portion and an opposing second end portion of the damper seal, the first end portion and the second end portion each extend towards the root when the damper seal is located in the cavity and wherein the damper seal has a variable thickness along at least a portion of a minor axis of the damper seal that extends between opposite peripheral edges of the main body portion.

In addition to one or more of the features described above, or as an alternative to any of the foregoing embodiments, the variable thickness of the damper seal may be provided by a taper that extends partially along the minor axis of the damper seal between the opposite peripheral edges of the main body portion.

In addition to one or more of the features described above, or as an alternative to any of the foregoing embodiments, the variable thickness of the damper seal may be aligned with a suction side of the platform.

In addition to one or more of the features described above, or as an alternative to any of the foregoing embodiments, the variable thickness of the damper seal may be provided by a curved taper that extends partially along the minor axis of the damper seal between the opposite peripheral edges of the main body portion.

In addition to one or more of the features described above, or as an alternative to any of the foregoing embodiments, the variable thickness of the damper seal may be provided by a stepped taper that extends partially along the minor axis of the damper seal between the opposite peripheral edges of the main body portion.

In addition to one or more of the features described above, or as an alternative to any of the foregoing embodiments, the variable thickness of the damper seal may be provided by a taper that extends completely across the minor axis of the damper seal between the opposite peripheral edges of the main body portion.

In addition to one or more of the features described above, or as an alternative to any of the foregoing embodiments, the variable thickness of the damper seal may be aligned with a suction side of the platform.

In addition to one or more of the features described above, or as an alternative to any of the foregoing embodiments, the variable thickness of the damper seal may be aligned with a pressure side of the platform.

In addition to one or more of the features described above, or as an alternative to any of the foregoing embodiments, the damper seal may be formed from stamped sheet metal.

In addition to one or more of the features described above, or as an alternative to any of the foregoing embodiments, the variable thickness along at least a portion of a minor axis of the damper seal may be an increasing thickness.

In addition to one or more of the features described above, or as an alternative to any of the foregoing embodiments, the blade may be a turbine blade.

In addition to one or more of the features described above, or as an alternative to any of the foregoing embodiments, the blade may be a compressor blade.

In yet another embodiment, a method of damping vibrations between adjoining blades of a gas turbine engine is provided. The method including the steps of: locating a damper seal adjacent to a seam defined by adjoining platforms of blades of the gas turbine engine; and restraining the movement of the damper seal in a direction away from the seam by locating a thicker portion of the damper seal with respect to other portions of the damper seal proximate to an underside surface of one of the adjoining platforms.

In addition to one or more of the features described above, or as an alternative to any of the foregoing embodiments, the thicker portion of the damper seal may be located on a suction side of the blade.

In addition to one or more of the features described above, or as an alternative to any of the foregoing embodiments, the thicker portion of the damper seal may be provided by a taper that extends partially along a minor axis of the damper seal that extends between opposite peripheral edges of a main body portion of the damper seal.

In addition to one or more of the features described above, or as an alternative to any of the foregoing embodiments, the variable thickness along at least a portion of a minor axis of the damper seal may be an increasing thickness.

In addition to one or more of the features described above, or as an alternative to any of the foregoing embodiments, the blade may be a turbine blade.

In addition to one or more of the features described above, or as an alternative to any of the foregoing embodiments, the blade may be a compressor blade.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
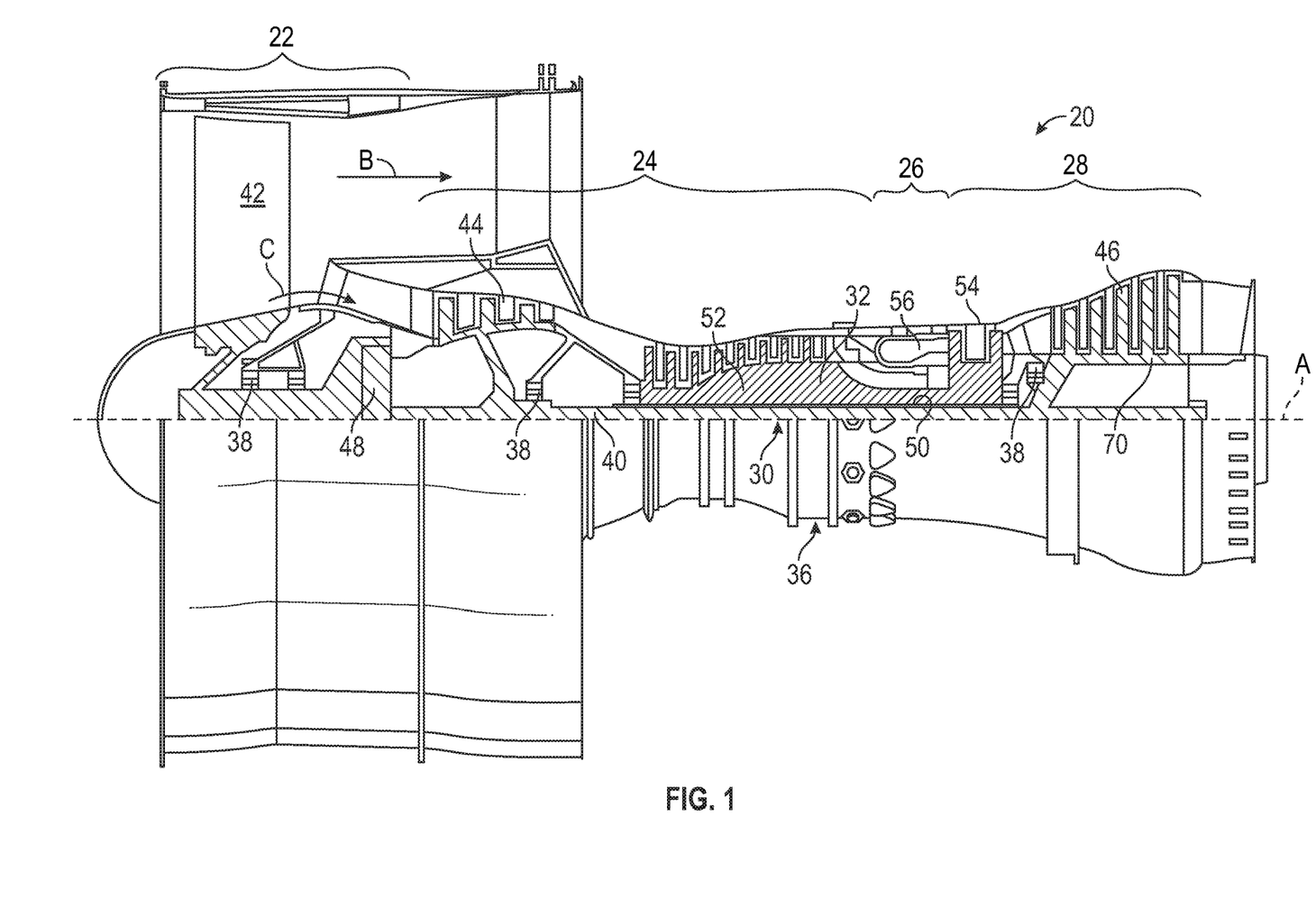
FIG. 1 is a partial cross sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

The turbine section 28 includes turbine discs 70 that each rotate about the axis A. As is known in the related arts, the turbine section may include a plurality of stages each having a plurality of turbine blades mounted to respective turbine disk of each stage.

Figure 2:
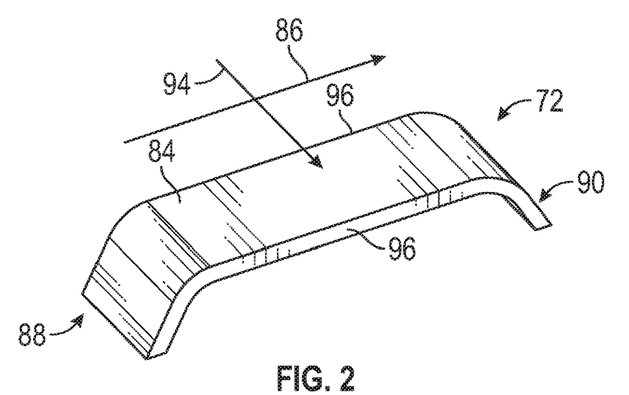
FIG. 2 is a non-limiting perspective view of a damper or damper seal.
Figure 3:
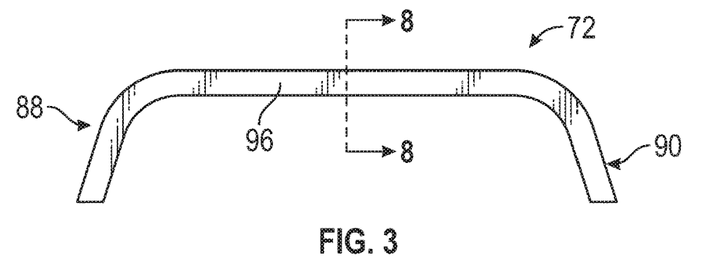
FIG. 3 is a side view of the damper seal illustrated in FIG. 2.

FIG. 2 illustrates a non-limiting perspective view of a damper seal or damper 72 for installation under platforms of adjacent turbine blades to reduce the vibratory response and provide frictional damping between the turbine blades as well as sealing the mate-face gap between blades. These dampers may be made of sheet metal and conform to the underside of the platform when subjected to centrifugal loads in a high temperature environment due to their lack of stiffness out-of-plane. Although the present disclosure is described with reference to turbine blades it is understood that anyone of the various embodiments disclosed herein may be applied to platforms of adjacent compressor blades of a compressor disc or rotor to reduce the vibratory response and provide frictional damping between the compressor blades as well as sealing the mate-face gap between blades. Therefore and when referring to FIGS. 4-12 these may alternatively be referred to as compressor blades. Moreover, various embodiments of the present disclosure may be applied in any other application where there is a desire to reduce the vibratory response and provide frictional damping between two adjoining items that are rotated about an axis as sealing the mate-face gap between the two adjoining items. FIG. 3 is a side view of the damper seal or damper 72 illustrated in FIG. 2.

The damper seal or damper 72 may also be formed by direct metal laser sintering. Other manufacturing methods are possible. The damper seal 72 may be ductile enough to conform to a lower surface of the platform of the turbine blade. In one example, the damper seal 72 is substantially c-shaped.

Figure 4:
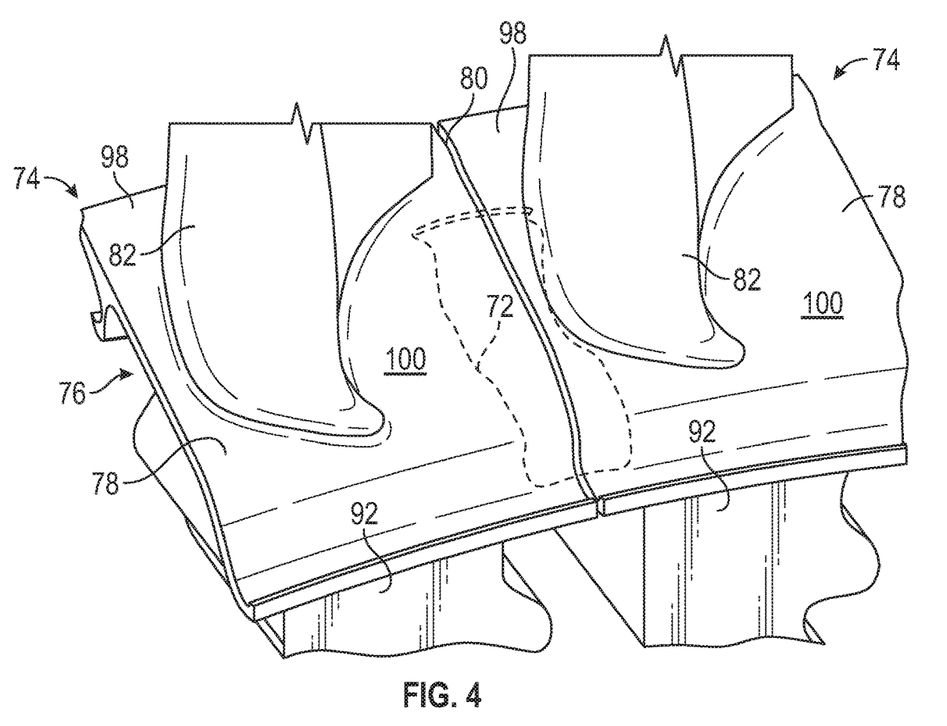
FIG. 4 is a perspective view of a damper seal installed between two adjacent turbine blades.
Figure 5:
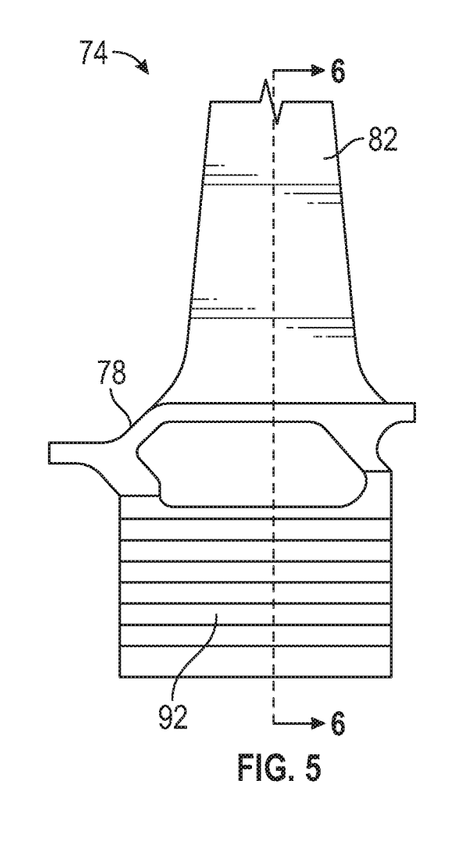
FIG. 5 is a side view of a turbine blade.
Figure 6:
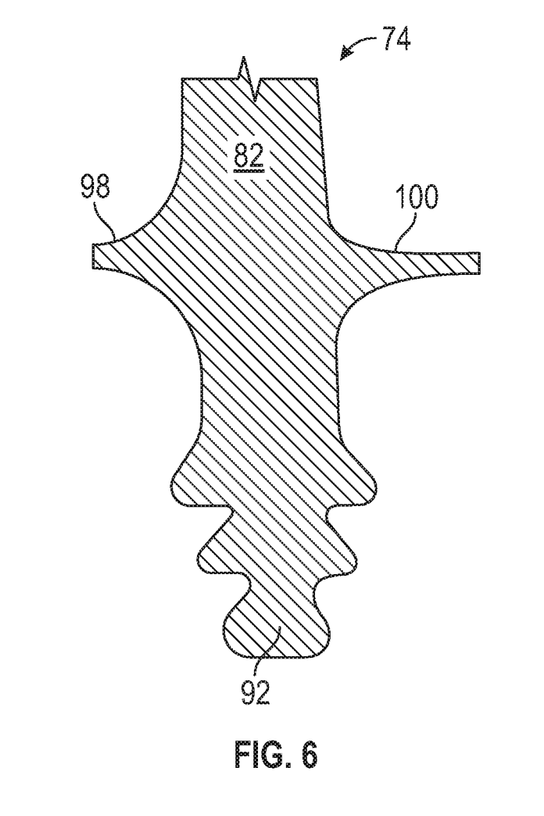
FIG. 6 is a view along lines 6-6 of FIG. 5.

Referring now to FIG. 4, a top perspective view of the damper seal 72 installed in adjacent turbine blades 74 is provided. The damper seal 72 is located in a neck cavity 76 of the turbine blades 74. As illustrated in at least FIGS. 4-7, the neck cavity 76 is defined as being located below the platform 78 of the turbine blade 74 and above the turbine disk the blades 74 are secured to.

As illustrated, the damper seal 72 spans a space 80 between adjacent platforms 78 of adjacent turbine blades 74 to provide both damping and sealing and prevent the leakage of the cooling air from the cavity 76. The damper seal 72 imposes a normal load on the adjacent turbine blades 74 due to centrifugal force. The resulting frictional force created by the normal load produces damping to reduce a vibratory response. The damper seal 72 prevents the cooling air in the neck cavity 76 from leaking into the hot flow gas path between airfoils 82 of the turbine blades 74.

The damper seal 72 is located under the platforms 78 of adjacent turbine blades 74 and spans the space 80 between the platforms 78. In accordance with an embodiment of the present disclosure, the damper seal 72 has a main body 84 portion that extends along a major axis 86 between a first end portion 88 and an opposing second end portion 90 of the damper seal 72. As illustrated, the first end portion 88 and the second end portion 90 extend towards a root 92 of the turbine blade 74 when the damper seal 72 is located in the cavity 76. The damper seal 72 also has a minor axis or width 94 that extends between opposite edges or peripheral edges 96 of the main body portion 84.

In accordance with one non-limiting embodiment of the present disclosure, the damper seal 72 is formed by a subsequent forming or stamping process, so that a thickness of the damper seal tapers or varies across the width or minor axis 94. In other words, the damper seal may have a variable thickness or an increasing thickness from one edge to an opposite edge across its minor axis or width 94. A damper 72 with a tapered design offsets the applied normal force to favor either the suction side 98 or pressure side 100 of the platform 78, depending on the direction of taper of the damper 72. The damper 72 would be "locked" for longer on the heavier side (i.e. it would not slide and would not provide damping) until the vibration amplitude is sufficiently increased. However, it would slide earlier on the lighter side or thinner side and provide damping at lower vibrational amplitudes. This could be especially advantageous if an initially designed constant thickness damper seal was found to be "locking up" at unacceptably high vibrational amplitudes. The existing damper 72 could be modified to have a tapered thickness, thus allowing one side of the damper to slip earlier and provide some damping.

Figure 12:
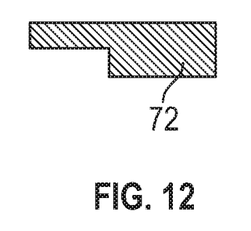

A tapered thickness along the tangential direction (minor axis, or width 94, FIG. 2) of the damper 72 is provided in accordance with various embodiments of the present disclosure. The taper can be linear (FIGS. 8 and 9), fully tapered (FIGS. 8 and 9), partially tapered (FIG. 10) or take on some curved (FIG. 11) or stepped profile (FIG. 12). The amount of taper does not need to be uniform down the axial direction of the damper (major axis 86, FIG. 2). Also, the taper does not need to begin or end at the edges 96 of the damper 72. The damper 72 can be manufactured by an existing sheet metal forming process, or by some additive method.

Figure 7:
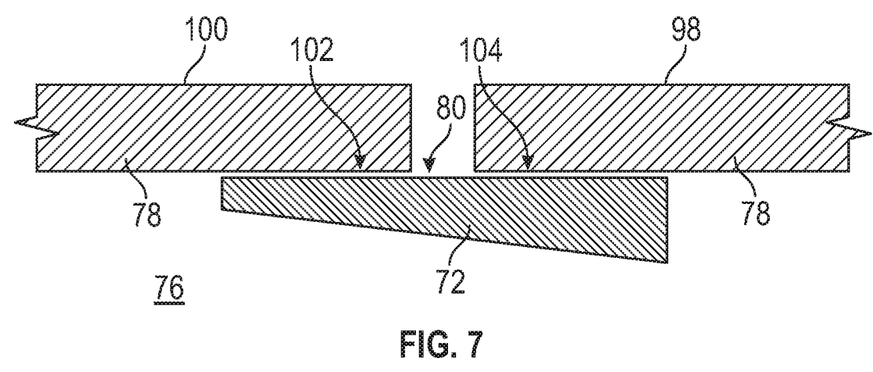
FIG. 7 is a cross sectional view illustrating a damper according to one embodiment.
Figure 8:
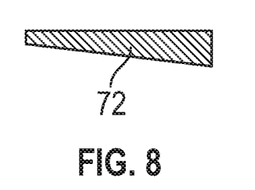
FIG. 8 is a view along lines 8-8 of FIGS. 3.
Figure 9:
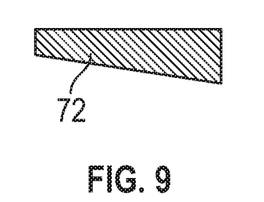
FIGS. 9-12 are cross sectional views illustrating a damper according to alternative embodiments.
Figure 10:
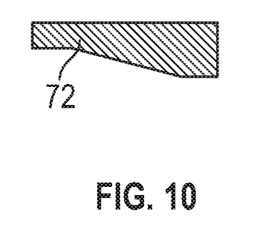
Figure 11:
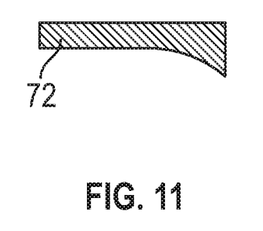

As illustrated in FIG. 7, a load 102 is reduced on the indicated side of the damper 72, which in this embodiment corresponds to the portion of the damper located proximate to the pressure side platform 100. As such, this side is easier to slip. In contrast and as the thickness of the damper 72 increases due to the taper, a load 104 is increased on the indicated side of the damper 72, which in this embodiment corresponds to the portion of the damper located proximate to the suction side platform 98. As such this side is harder to slip due to the corresponding loads. It is, of course, understood that if desired the thickness of the damper 72 may be reversed and the higher load is on the pressure side 100 of the platform 78 while the lower load 102 is on the suction side 98 of the platform 78.

This design feature (e.g., damper 72 with a tapered thickness) allows the potential elimination of weight increasing damper restraint devices that are formed or included with the turbine blades 74. Moreover, various embodiments disclosed herein can make new and current damper designs more effective without radically modifying the damper itself The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A disk of a gas turbine engine having a plurality of blades each of the plurality of blades being secured to the disk, each blade comprising:
    a root;
    a platform located between the root and an airfoil of the blade, wherein the platforms of adjacent blades of the disk define a cavity; and
    a damper seal received in the cavity and having a first surface located adjacent to a seam between the adjacent blades of the disk, the damper seal having a main body portion that extends along a major axis of the damper seal between a first end portion and an opposing second end portion of the damper seal, the first end portion and the second end portion each extend towards the root when the damper seal is located in the cavity and wherein the damper seal has a continuously increasing thickness on a second surface opposite to the first surface that extends from one peripheral edge of the main body portion to an opposite peripheral edge of the main body portion along at least a portion of a minor axis of the damper seal that extends across the major axis of the damper seal.

2. The disk as in claim 1, wherein the increasing thickness of the damper seal is provided by a taper.

3. The disk as in claim 2, wherein the increasing thickness of the damper seal is aligned with a suction side of the platform.

4. The disk as in claim 1, wherein the increasing thickness of the damper seal is provided by a curved taper that extends partially along the minor axis of the damper seal between the opposite peripheral edges of the main body portion.

5. The disk as in claim 1, wherein the increasing thickness of the damper seal is provided by a stepped taper that extends partially along the minor axis of the damper seal between the opposite peripheral edges of the main body portion.

6. The disk as in claim 1, wherein the increasing thickness of the damper seal is provided by a taper that extends completely across the minor axis of the damper seal between the opposite peripheral edges of the main body portion.

7. The disk as in claim 1, wherein the increasing thickness of the damper seal is aligned with a suction side of the platform.

8. The disk as in claim 1, wherein the increasing thickness of the damper seal is aligned with a pressure side of the platform.

9. The disk as in claim 1, wherein the damper seal is formed from stamped sheet metal and wherein the blade is either a turbine blade or a compressor blade.

10. A gas turbine engine, comprising:
    a disk;
    a plurality of blades secured to the disk, each of the blades having a root, and a platform located between the root and an airfoil of the blade, wherein a seam is defined by adjacent platforms of each of the blades when they are secured to the disk; and a damper seal received in the cavity and having a first surface located adjacent to the seam between the adjacent blades of the disk, the damper seal having a main body portion that extends along a major axis of the damper seal between a first end portion and an opposing second end portion of the damper seal, the first end portion and the second end portion each extend towards the root when the damper seal is located in the cavity and wherein the damper seal has a continuously increasing thickness on a second surface opposite to the first surface that extends from one peripheral edge of the main body portion to an opposite peripheral edge of the main body portion along at least a portion of a minor axis of the damper seal that extends across the major axis of the damper seal.

11. The gas turbine engine as in claim 10, wherein the increasing thickness of the damper seal is provided by a taper.

12. The gas turbine engine as in claim 11, wherein the increasing thickness of the damper seal is aligned with a suction side of the platform.

13. The gas turbine engine as in claim 10, wherein the increasing thickness of the damper seal is provided by a curved taper that extends partially along the minor axis of the damper seal between the opposite peripheral edges of the main body portion.

14. The gas turbine engine as in claim 10, wherein the increasing thickness of the damper seal is provided by a stepped taper that extends partially along the minor axis of the damper seal between the opposite peripheral edges of the main body portion.

15. The gas turbine engine as in claim 10, wherein the increasing thickness of the damper seal is provided by a taper that extends completely across the minor axis of the damper seal between the opposite peripheral edges of the main body portion.

16. The gas turbine engine as in claim 10, wherein the increasing thickness of the damper seal is aligned with a suction side of the platform.

17. The gas turbine engine as in claim 10, wherein the increasing thickness of the damper seal is aligned with a pressure side of the platform.

18. The gas turbine engine as in claim 10, wherein the damper seal is formed from stamped sheet metal.

19. A method of damping vibrations between adjoining blades of a gas turbine engine, comprising:

locating a damper seal adjacent to a seam defined by adjacent platforms of blades secured to a disk of the gas turbine engine; and restraining the movement of the damper seal in a direction away from the seam by locating a thicker portion of the damper seal with respect to other portions of the damper seal proximate to an underside surface of one of the adjacent platforms, wherein the damper seal has a main body portion that extends along a major axis of the damper seal between a first end portion and an opposing second end portion of the damper seal, the first end portion and the second end portion each extend towards a root of the blades when the damper seal is located in a cavity defined by the platforms of adjacent blades and wherein the damper seal has a first surface adjacent to the seam and a continuously increasing thickness on a second surface opposite to the first surface extending from one peripheral edge of the main body portion to an opposite peripheral edge of the main body portion along at least a portion of a minor axis of the damper seal that extends across the major axis of the damper seal.

20. The method as in claim 19, wherein the thicker portion of the damper seal is located on a suction side of the blade and wherein the thicker portion of the damper seal is provided by a taper that extends partially along a minor axis of the damper seal that extends between the opposite peripheral edges of the main body portion of the damper seal.

* * * * *